(No Model.)

W. MAGUIRE.
FOLDING SCALE PAN.

No. 295,785. Patented Mar. 25, 1884.

Witnesses:
W. L. Langley
A. E. Eader

Inventor:
William Maguire
By his Atty
Chas. B. Mann

UNITED STATES PATENT OFFICE.

WILLIAM MAGUIRE, OF BALTIMORE, MARYLAND.

FOLDING SCALE-PAN.

SPECIFICATION forming part of Letters Patent No. 295,785, dated March 25, 1884.

Application filed October 21, 1881. Renewed December 20, 1883. (No model.)

*To all whom it may concern:*

Be it known that I, WILLIAM MAGUIRE, a citizen of the United States, residing at Baltimore, in the county of Baltimore and State of Maryland, have invented certain new and useful Improvements in Scale-Pans, of which the following is a specification, reference being had therein to the accompanying drawings.

My invention relates to certain improvements in scale-pans by which an article specially adapted for the use of butchers and marketmen is provided.

Figure 1:
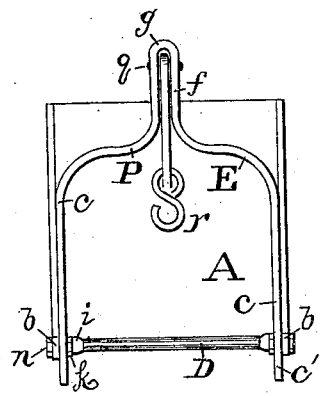
Figure 2:
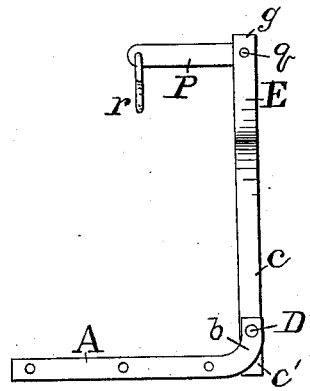
Figure 3:
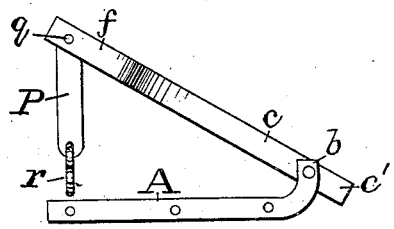
Figure 4:
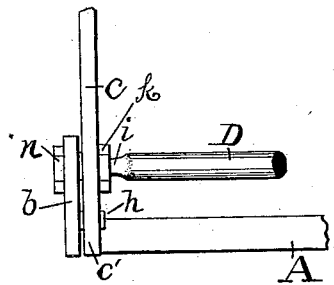
Figure 5:
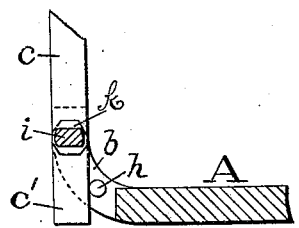

In the drawings hereto annexed, Figure 1 is a view of the scale-pan, showing the hanger turned or folded down against the pan. Fig. 2 is a side view of the scale-pan and hanger, the latter being in a vertical position, as when it is suspended. Fig. 3 is a side view, showing the hanger partly turned down. Figs. 4 and 5 are detail views, larger scale, showing more clearly the means of hinging the hanger to the scale-pan.

The letter A designates the scale-pan, which may be made of any suitable material, and may be square, oval, or other shape. At one side of the pan the hanger is attached by a hinged joint, which is so arranged as to allow the hanger to turn down onto or against the pan, as shown in Fig. 1, or to stand at right angles with the pan, as shown in Fig. 2. The pan is provided on one side with two upturned plates, $b$, to each of which one of the two legs $c$ of the hanger is jointed by the rod D, which extends across from one plate to the other.

The hanger E consists of the two legs $c$, the upper parts of which curve toward each other, and thence extend parallel with each other, as at $f$, and join at their uppermost part, $g$. Practically the two legs are made of a single piece of bar metal, and are simply bent to the described form. The lower end of each leg extends past the hinging-point—that is, the rod D—and forms an extension, $c'$, and each upturned plate $b$ is provided, at a point below that at which the pivoting-rod D passes, with a lug or pin, $h$, against which the extension ends $c'$ of the legs abut, and which serves as a stop to retain the pan in a proper horizontal position. In the construction of this part of the invention the rod D, near each end, is flattened or squared, as shown at $i$, to form a shoulder, against which the washer or collar $k$ rests. That portion of each end of the rod which passes through the leg and the upturned plate is a true round to afford a good joint or hinge, while the extremity is threaded to receive the nut $n$. By these means the hanger is adapted to sustain the pan for use as a scale in a horizontal position, and to turn down onto the pan when not in use, thus putting the scale in a compact shape for carriage in a wagon. Between the upper parallel part of the two legs of the hanger an arm, P, is pivoted by a bolt or pin, $q$, and said arm is adapted to swing between the two parallel parts, as shown in Fig. 1, whereby to make the scale and hanger compact, or to be extended in a horizontal position at right angles with the hanger, as shown at Fig. 2, and thus serve to maintain the pan in a proper level. The extremity of the arm is provided with a hook, $r$, by which it is suspended. When the arm is extended the upper edge of the arm comes against the part of joinder $g$ of the two legs of the hanger, which serves as a stop to limit the movement of the arm.

Having described my invention, I claim and desire to secure by Letters Patent of the United States—

1. In a scale-pan, the combination of a pan, a hanger consisting of two legs, the upper ends of which curve toward each other and join, and the lower ends of which are spread apart, each leg being jointed to one side of the pan, and a stop device, substantially as described, to retain the pan in proper position with respect to the hanger, as set forth.

2. In a scale-pan, the combination of a hanger to support the pan having two legs, which join at the uppermost part, and an arm pivoted between the legs by which the scale is suspended, as set forth.

3. An improved scale-pan, consisting of a pan, A, a hanger, E, hinged to one side only of the pan, a stop device to retain the pan in proper position for use, and an arm pivoted at the upper end of the hanger, as shown and described.

In testimony whereof I affix my signature in presence of two witnesses.

WILLIAM MAGUIRE.

Witnesses:
   CHAS. B. MANN,
   J. J. SELDUER.